US010963026B2

(12) United States Patent
Cho et al.

(10) Patent No.: US 10,963,026 B2
(45) Date of Patent: Mar. 30, 2021

(54) DIGITAL SIGNAL TRANSITION COUNTERS FOR DIGITAL INTEGRATED CIRCUITS

(71) Applicant: UNIVERSITY OF SOUTHERN CALIFORNIA, Los Angeles, CA (US)

(72) Inventors: Young H. Cho, Chatsworth, CA (US); Siddharth S. Bhargav, Los Angeles, CA (US); Andrew Goodney, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 432 days.

(21) Appl. No.: 15/807,487

(22) Filed: Nov. 8, 2017

(65) Prior Publication Data
US 2018/0088645 A1    Mar. 29, 2018

Related U.S. Application Data

(62) Division of application No. 14/226,085, filed on Mar. 26, 2014, now abandoned.
(Continued)

(51) Int. Cl.
| G06F 119/06 | (2020.01) |
| G06F 11/30  | (2006.01) |
| G06F 1/26   | (2006.01) |
| G06F 1/3203 | (2019.01) |
| G06F 11/34  | (2006.01) |
| G06F 30/33  | (2020.01) |
| G06F 30/367 | (2020.01) |
(Continued)

(52) U.S. Cl.
CPC .............. *G06F 1/26* (2013.01); *G06F 1/3203* (2013.01); *G06F 11/3027* (2013.01); *G06F 11/3062* (2013.01); *G06F 11/348* (2013.01);
*G06F 11/3003* (2013.01); *G06F 11/3089* (2013.01); *G06F 11/3466* (2013.01); *G06F 30/33* (2020.01); *G06F 30/3312* (2020.01); *G06F 30/367* (2020.01); *G06F 2119/06* (2020.01); *G06F 2119/12* (2020.01); *G06F 2201/865* (2013.01); *G06F 2201/88* (2013.01); *Y02D 10/00* (2018.01)

(58) Field of Classification Search
CPC ........................................................ G06F 1/26
See application file for complete search history.

(56) References Cited

U.S. PATENT DOCUMENTS

| 6,021,381 A  | 2/2000 | Ohnishi   |
| 8,010,824 B2 | 8/2011 | Naffziger |
(Continued)

OTHER PUBLICATIONS

Abella, J. et al. 2007. Penelope: The NBTI-Aware Processor. 40th IEEE/ACM International Symposium on Micro-architecture, pp. 85-96.
(Continued)

*Primary Examiner* — Kim Huynh
*Assistant Examiner* — Eric Chang
(74) *Attorney, Agent, or Firm* — Brooks Kushman P.C.

(57) ABSTRACT

A digital integrated circuit comprising may include a digital sensor circuit that converts binary bit patterns of wires in a sub-circuit over a given time into a single integer value that represents the total activity of a sub-circuit, and a digital data processing circuit that receives multiple activity integer values from multiple digital sensors in multiple sub-circuits and logically combines the values or uses a lookup table to output a single integer value that represents the total activity of a larger sub-circuit.

21 Claims, 7 Drawing Sheets

Related U.S. Application Data

(60) Provisional application No. 61/805,452, filed on Mar. 26, 2013.

(51) Int. Cl.
*G06F 30/3312* (2020.01)
*G06F 119/12* (2020.01)

(56) References Cited

U.S. PATENT DOCUMENTS

| | | |
|---|---|---|
| 2005/0280454 A1 | 12/2005 | Szajnowski |
| 2011/0084769 A1 | 4/2011 | Wicpalek |
| 2012/0109550 A1 | 5/2012 | Naffziger |
| 2013/0191054 A1 | 7/2013 | Cho et al. |

OTHER PUBLICATIONS

Alam, M.A. 2003. A Critical Examination of the Mechanics of Dynamic NBTI for PMOSFETs. 2003 IEEE Electron Devices Meeting, Dec. 2003, pp. 14.1.1-14.4.4.
Altera Corporation. 2005. PowerPlay Early Power Estimator User Guide for Stratix, Stratix GX & Cyclone FPGAs, Version 2 (FPGA User Manual), Oct. 2005, . (http://www.altera.com/literature/ug/ug_PC.pdf). 30 pages.
Anderson, J.H. et al. 2004. Power Estimation Techniques for FPGAs, IEEE Transactions on Very Large Scale Integration (VLSI) Systems, vol. 12, pp. 1015-1027, 2004.
Bhargav, S. et al. 2012. Measuring Power Digitally with Numerical Analysis. ACM Sigmetrics, London, UK, Jun. 2012, 2 pages.
Brooks, D. et al. 2000. Waatch: A Framework for Architectural-Level Power Analysis and Optimizations. ISCA-27, Jun. 2000, pp. 83-94.
Bryant, R.E. 1986. Graph-Based Algorithms for Boolean Function Manipulation, IEEE Transactions on Computers, C-35(8):677-691, 1986.
Floyd, M. et al. 2011. Introducing the Adaptive Energy Management Features of the Power7 Chip. IEEE Micro, 31, 2, (Mar.-Apr. 2011), pp. 60-75.
Isci, C. et al. 2003. Runtime Power Monitoring in High-End Processors:Methodology and Empirical Data. Proc. MICRO, 2003, pp. 93-104.
Kang, C.W. et al. 2006. Low-power clustering with minimum logic replication for coarse grained, antifuse based FPGAs. Proceedings GLSVLSI '06, Apr. 30-May 2, 2006, Philadelphia, PA, pp. 79-84.
Kim, Y. et al. 2009. ViridiScope: Design and Implementation of a Fine Grained Power Monitoring System for Homes, UbiComp 2009, Sep. 30-Oct. 3, 2009, Orlando FL, pp. 245-254.
McIntire, D. et al. 2006. The low power energy aware processing (LEAP) embedded networked sensor system, IPSN, Apr. 19-21, 2006, Nashville, TN, pp. 449-457.
Mintarno, E. et al. 2011. Self-Tuning for Maximize Lifetime Energy-Efficiency in the Presence of Circuit Aging. IEEE Transactions on Computer-Aided Design of Integrated Circuits and Systems vol. 30, No. 5, May 2011, pp. 760-773.
Monteiro, J. et al. 1997. Estimation of Average Switching Activity in Combinational Logic Circuits Using Symbolic Simulation. IEEE Transactions on Computer-Aided Design of Integrated Circuits and Systems, vol. 16, No. 1, Jan. 1997, pp. 121-127.
Murmann, B. 2008. A/D Converter Trends: Power Dissipation, Scaling and Digitally Assisted Architectures. IEEE 2008 Custom Integrated Circuits Conference (CICC) 2008, pp. 105-112.
Najm, F.N. 1995. Towards a High-Level Power Estimation Capability. ACM/IEEE International Symposium on Low Power Design, 1995, 6 pages.
Nemani, M. et al. 1996. Towards a High-Level Power Estimation Capability. Submitted to the IEEE Trans. on CAD of Integrated Circuits and Systems, vol. 15, No. 6: pp. 588-598 (1996).
opencores.org. 2000-2014. OpenRISC 10 (L00 Architecture Manual. Architecture Version 1.1, Document Revision 0, Apr. 21, 2014, 358 pages. (http://opencores.org/or1k/Main_Page).
Qazi, M. et al. 2010. A 512kb 8T SRAM Macro Operating Down to 0.57 V with an AC-coupled sense amplifier and embedded data-retention-voltage sensor in 45 nm SOI CMOS, in Proc. IEEE ISSCC (Solid-State Circuits Conference Digest of Technical Papers (ISSCC)) Feb. 2010, pp. 350-351.
Sinangil, M E. et al. 2012. Design of Low-Voltage Digital Building Blocks and ADCs for Energy-Efficient Systems. IEEE Trans on circuits and systems—II: Express Briefs, vol. 59, No. 9, Sep. 2012, pp. 533-537.
Stackhouse, B. et al. 2009. A 65 nm 2-billion transistor Quad-Core Itanium Processor, IEEE JSSCC Dig., Jan. 2009, pp. 18-31.
XILINX. 2012. XPower Estimator User Guide, V. 13.4, Jan. 18, 2012, 64 pages. (http://www.xilinx.com/support/documentation/user_guides/ug440.pdf).

DIGITAL SIGNAL TRANSITION COUNTERS FOR DIGITAL INTEGRATED CIRCUITS

CROSS-REFERENCE TO RELATED APPLICATIONS

This application is a divisional of U.S. Utility patent application Ser. No. 14/226,085 filed Mar. 6, 2014 entitled "DIGITAL SIGNAL TRANSITION COUNTERS FOR DIGITAL INTEGRATED CIRCUITS", which is based upon and claims priority to U.S. provisional patent application 61/805,452, entitled ACCURATE DIGITAL SENSORS FOR DIGITAL CIRCUITS," filed Mar. 26, 2013. This application is related to U.S. patent application Ser. No. 13/719,916, entitled "Digital Circuit Power Measurements Using Numerical Analysis," filed Dec. 19, 2012, which is based upon and claims priority to U.S. provisional patent application 61/589,988, entitled "Method of Measuring Accurate Dynamic Power Consumption of Integrated Component and Sub-Circuits," filed Jan. 24, 2012. The entire content of these patent applications is incorporated herein by reference.

BACKGROUND

Technical Field

This disclosure relates to determining the amount of power being used by digital circuits and to power management and other applications for this information.

Description of Related Art

Dynamic power management algorithms can improve the way computing systems utilize available power. Algorithms can rely on power measurements or estimates to make intelligent power management decisions. For emerging computer technologies, accuracy and resolution of power measurement may play a greater role in low power system designs and dynamic power management plans.

Power consumed by an electric circuit can be directly measured with current sense resistors, amplifiers, and analog-to-digital converters (ADCs). This may be the most intuitive way of measuring power accurately in digital circuits. However, it may introduce practical challenges for emerging platforms such as mobile phones and systems-on-chips (SOCs). These challenges may include scalability, instrumentation error, and ADC related resource overhead.

System developers have been interested in measuring power at a board level for low-power operation and at chip level to increase manufacturing yield. Broadly speaking, three techniques have been considered: (1) direct measurement with ADC; (2) power model based estimation; and (3) a hybrid method using sensors and power models.

Power Model Based Estimation and Simulation

This type of power estimation may rely on an accurate, on-line extraction of a power model for each architecture component from workload information and external ADC based power measurement. This method may eliminate the need for ADCs on-chip. However, the system may rely on values from external ADCs over long windows of time to build workload specific power models. With significant differences found in resulting power models across different workloads, errors can be evident, even at low sampling rates and fewer channels Based on the power models of digital circuits, power can be estimated with worst case overhead for a given circuit. However, unlike in the past, it may no longer be possible to use overly pessimistic estimates, since the overheads of corresponding overdesign are growing. Also, such overheads are becoming much less acceptable as the gains provided by each new technology generation are diminishing for many key parameters One of the key consequences of this is that static estimation approaches, i.e., low run-time complexity approaches that analyze a circuit without using any particular input vector sequence by implicitly capturing the worst-case over all possible sequences, are becoming less acceptable since worst-case analysis is typically pessimistic for many important parameters. Hence, it is becoming more important to use dynamic approaches, i.e., approaches that consider input vector sequences, e.g., simulations of vector sequences for typical applications.

Accurate estimation of severity may require simulations and analyses at a level that is much more detailed than the logic-level. In particular, many of the above phenomena may require information about timing and hazards and some may require circuit-level (i.e., SPICE-like) simulations. Furthermore, accurate estimations may require values of circuit parameters, e.g., node capacitances and impedance of power-ground pins, just to name two.

Accurate power estimation for typical vector sequences may require simulations to capture, for every vector in the sequence and at every circuit line, the 0-to-$V_{dd}$ and $V_{dd}$-to-0 transitions, various hazards/glitches and the corresponding voltage levels, and the values of parasitic capacitance and inductance derived from layout. While logic-level simulation can capture 0-to-$V_{dd}$ and $V_{dd}$-to-0 transitions, capturing hazards/glitches and the corresponding voltages may require circuit-level simulations.

While the availability of tools that capture process variations has been growing, these may have higher run-time complexities than their classical counterparts. The run-time complexity may be particularly high when trying to capture the impact of variations during dynamic analyses and simulations.

Dedicated Analog to Digital Converters

Recent works, like Low Power Energy Aware Processing (LEAP) platform and MIT's recent on-chip ADC based power minimization technique have been used to directly measure power. However, such techniques may suffer instrumentation errors, aging, scalability, and delays associated with ADCs. Also, as the intrinsic gain of transistors decreases with manufacturing technology scaling, it may become harder to implement such technologies using on-chip ADCs.

SUMMARY

A digital integrated circuit may include a digital data processing circuit having multiple signal lines that each go through signal transitions during operation of the digital data processing circuit. A digital counter circuit may count the combined number of signal transitions that take place on at least two of the multiple signal lines during operation of the digital circuit.

The at least two of the multiple signal lines may go through a signal transition at substantially the same time. The digital counter circuit may increment the count only once or in an amount equal to the number of the at least two of the multiple signal lines when the at least two of the multiple signal lines go through a signal transition at substantially the same time.

The digital integrated circuit may include a sampling circuit that samples the count periodically.

The digital integrated circuit may include a non-linear compensation circuit that compensates the sampled periodic counts for nonlinearities between changes in the number of transitions and changes in the power consumed by the digital circuit that result from these transitions. The nonlinear compensation circuit may include a lookup table.

The digital integrated circuit may output the sampled counts.

The digital integrated circuit may compute information indicative of an amount of power being consumed by a sub-circuit of the digital integrated circuit based on at least one of the sampled counts.

A digital integrated circuit may include a digital data processing circuit having at least one signal line that goes through signal transitions during operation of the digital data processing circuit. A digital counter circuit may count the number of times a particular pattern of signal transitions takes place on the least one signal line during operation of the circuit.

The digital data processing circuit may have multiple signal lines, each of which goes through signal transitions during operation of the digital data processing circuit. The digital counter circuit may count the number of times a particular pattern of transitions takes place on each of at least two of the multiple signal lines during operation of the circuit.

The at least two of the multiple signal lines may go through a particular pattern of signal transitions at substantially the same time. The digital counter circuit may increment the count only once or in an amount equal to the number of the at least two of the multiple signal lines when the at least two of the multiple signal lines go through the particular pattern of signal transitions at substantially the same time.

The digital integrated circuit may include a non-linear compensation circuit that compensates the sampled periodic counts for nonlinearities between changes in the number of particular pattern signal transitions and changes in the power consumed by the digital circuit that result from these transitions. The non-linear compensation circuit may include a lookup table.

A non-transitory, tangible, computer-readable storage medium containing a program of instructions that causes a computer system running the program of instructions to: receive information indicative of a composition of a digital integrated circuit, input vectors to the digital integrated circuit, and how much power is being consumed by the digital integrated circuit under each of the input vectors. The program may output information indicative of an amount of power being consumed by each of multiple, different sub-sections of the digital integrated circuit while responding to the input vectors.

The information outputted may include information indicative of an amount of power being consumed by each of the multiple, different sub-sections of the digital integrated circuit while responding to input vectors other than the received input vectors.

The received information that is indicative of the composition of the digital integrated circuit may include information identifying at least one signal line within the digital integrated circuit. The program of instructions may compute the number of transitions that take place on the at least one signal line while responding to the input vectors.

The received information that is indicative of the composition of the digital integrated circuit may include information identifying at least one signal line within the digital integrated circuit. The program of instructions may compute the number of times a particular pattern of transitions takes place on the least one signal line while responding to the input vectors.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Estimation of key parameters may be made for long input vector sequences for real-life applications at levels of accuracy that are close to those that can be obtained via detailed circuit-level simulations or precise measurements on fabricated chips. The resulting run-time complexities (and thus speed of execution) are close to those for logic-level simulations. Using hardware emulation techniques can further reduce the run-time complexity for key parameter estimation.

Fast-but-inaccurate logic-level simulation for an entire long sequence of vectors may be combined with slow-but-accurate circuit-level simulations for selected small subsequences of vectors. (The term circuit-level simulation is used herein to describe SPICE-like simulation that uses detailed information about parameters and parasitics derived from chip layout, and considers process variations, as well as variations in the values of environmental variables.)

Figure 1:
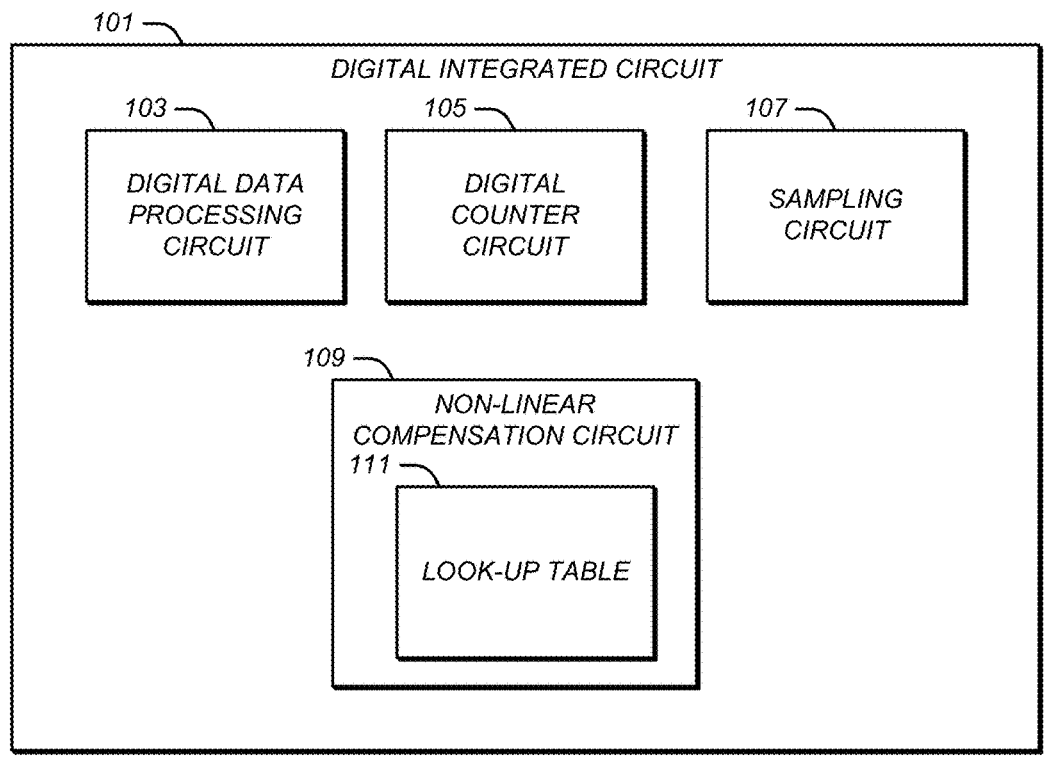
FIG. 1 illustrates a digital integrated circuit that may include a digital data processing circuit, a digital counter circuit, a sampling circuit, and a non-linear compensation circuit that may include a look-up table.

FIG. 1 illustrates a digital integrated circuit 101 that may include a digital data processing circuit 103, a digital counter circuit 105, a sampling circuit 107, and a non-linear compensation circuit 109 that may include a look-up table 111.

The digital data processing circuit 103 may have multiple signal lines that each go through signal transitions during operation of the digital data processing circuit. The digital counter circuit 105 may count the combined number of signal transitions that take place on at least two of the multiple signal lines during operation of the digital circuit.

The at least two of the multiple signal lines may go through a signal transition at substantially the same time. The digital counter circuit 105 may increment the count only once or in an amount equal to the number of the at least two of the multiple signal lines when the at least two of the multiple signal lines go through a signal transition at substantially the same time.

The sampling circuit 107 may sample the count periodically.

The non-linear compensation circuit 109 may compensate the sampled periodic counts for nonlinearities between changes in the number of transitions and changes in the power consumed by the digital circuit that result from these transitions. The non-linear compensation circuit 111 may include a lookup table.

The digital integrated circuit 101 may output the sampled counts.

The digital integrated circuit may compute information indicative of an amount of power being consumed by a sub-circuit of the digital integrated circuit based on at least one of the sampled counts.

The digital data processing circuit 103 may have at least one signal line that goes through signal transitions during operation of the digital data processing circuit. The digital counter circuit 105 may count the number of times a particular pattern of signal transitions takes place on the least one signal line during operation of the circuit.

The digital data processing circuit 103 may have multiple signal lines, each of which goes through signal transitions during operation of the digital data processing circuit. The digital counter circuit 105 may count the number of times a particular pattern of transitions takes place on each of at least two of the multiple signal lines during operation of the circuit.

The at least two of the multiple signal lines may go through a particular pattern of signal transitions at substantially the same time. The digital counter circuit 105 may increment the count only once or in an amount equal to the number of the at least two of the multiple signal lines when the at least two of the multiple signal lines go through the particular pattern of signal transitions at substantially the same time.

The non-linear compensation circuit may compensate the sampled periodic counts for nonlinearities between changes in the number of particular pattern signal transitions and changes in the power consumed by the digital circuit that result from these transitions.

Figure 2:
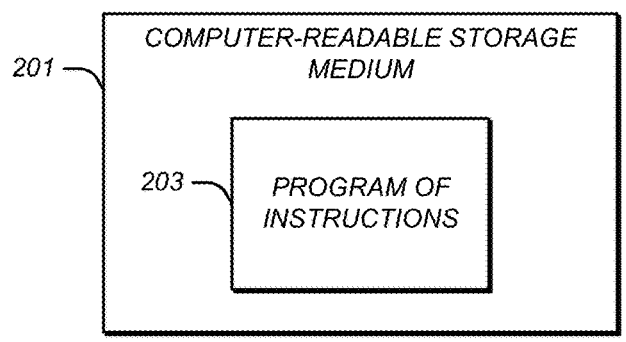
FIG. 2 illustrates a computer-readable storage medium that may contain a program of instructions.

FIG. 2 illustrates a computer-readable storage medium 201, such as one or more hard disk drives, CD/DVD drives, flash memories, random access memories (RAMs), read-only memories (ROMs), and/or programmable read only memories (PROMS)), tangible storage devices, that may contain a program of instructions 203.

The program of instructions 203 may causes a computer system running the program of instructions to: receive information indicative of a composition of a digital integrated circuit, input vectors to the digital integrated circuit, and how much power is being consumed by the digital integrated circuit under each of the input vectors; and output information indicative of an amount of power being consumed by each of multiple, different sub-sections of the digital integrated circuit while responding to the input vectors.

Various refinements of one or more of these components and process steps are now described.

The information outputted may include information indicative of an amount of power being consumed by each of the multiple, different sub-sections of the digital integrated circuit while responding to input vectors other than the received input vectors.

The received information that is indicative of the composition of the digital integrated circuit may include information identifying at least one signal line within the digital integrated circuit. The program of instructions 203 may compute the number of transitions that take place on the at least one signal line while responding to the input vectors.

The received information that is indicative of the composition of the digital integrated circuit may include information identifying at least one signal line within the digital integrated circuit. The program of instructions 203 may compute the number of times a particular pattern of transitions takes place on the least one signal line while responding to the input vectors.

Figure 3:
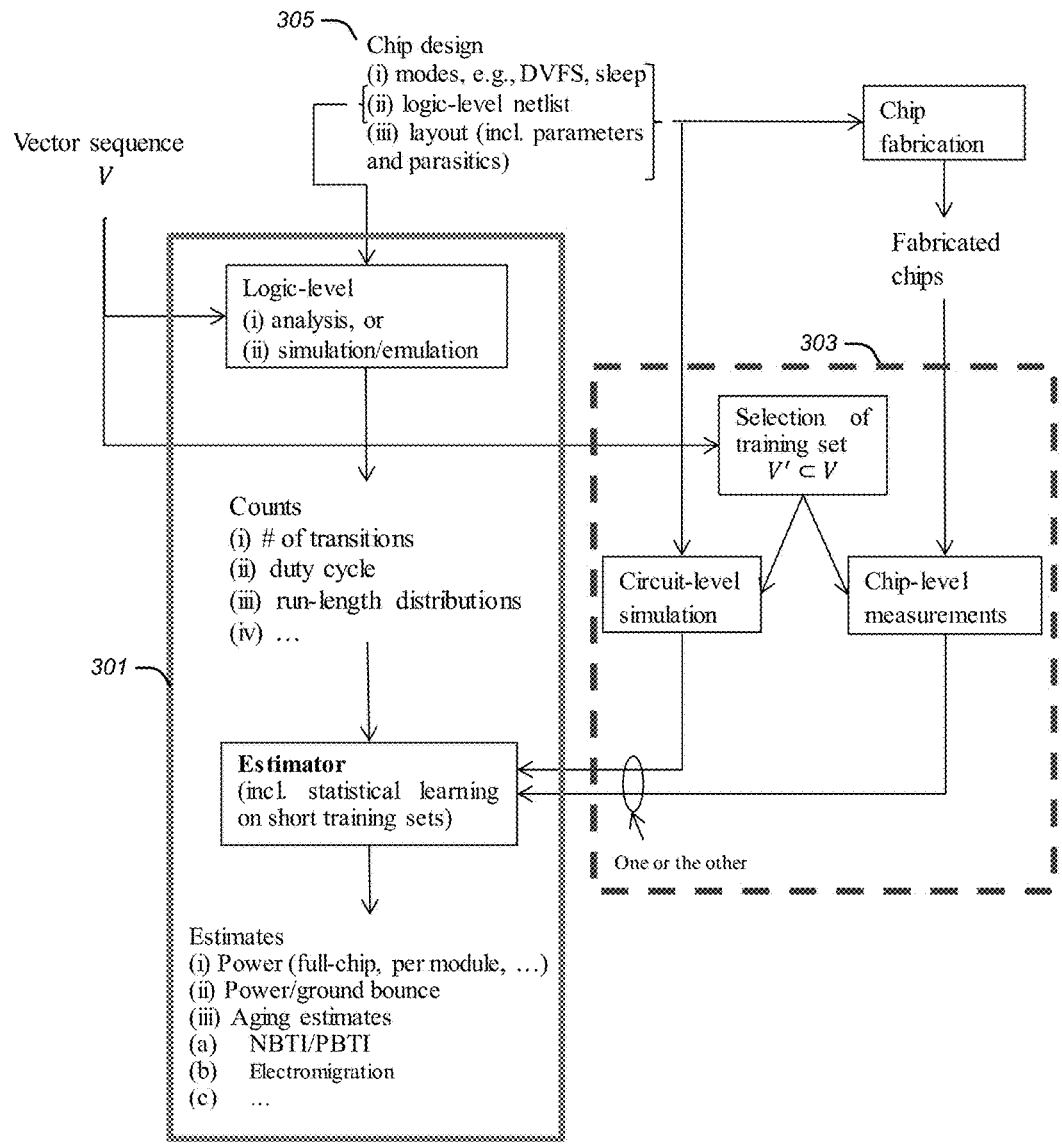
FIG. 3 illustrates an example of processes for simulation and physical integrated circuit fabrication.

FIG. 3 illustrates an example of processes for simulation 301 and physical integrated circuit fabrication 303.

The overall goal of the process may be, inter alia, to derive key parameters for a circuit that can be used to estimate power usage, Vdd/ground bounce, aging, NBTI/PBTI and/or other parametric features of the integrated circuit.

An integrated circuit design 305 may include a logic level netlist and layout that may be provided to an integrated circuit manufacturer and fabricated into an integrated circuit chip. At the same time, the same design information can be made available to a simulation sub-process 301.

The simulation sub-process 301 may receive and process a given input vector sequence 307. The simulation sub-process 301 may only use low run-time complexity logic-level simulation, or logic-level analysis or hardware based emulation that have run-time complexities that are dramatically lower. The sub-process may be executed only for a very small fraction of the given sequence of input vectors, as it is may only be used during a statistical learning phase. For example, this may only be executed for a few hundred vectors sufficient for Q values to converge in a preliminary power estimation approach.

A first main input to the fabrication sub-process 303 may be a complete, hierarchical design of a chip that may include a logic-level netlist of the design, as well as its layout. Existing industry standard tools can (such as HSPICE) be used to extract values of various parameters and parasitics from the layout. In addition, in conjunction with information provided by a foundry, standard approaches (such as technology files for HSPICE) can be used to capture the impact of process variations on the values of these parameters and parasitics.

The design information may also contain higher level information about chips, such as major operational modes including various DVFS and sleep modes.

A second key input to the fabrication process 303 may be a sequence of input vectors 307 for typical applications expected to run on the chip. The first module of the framework may be a logic-level analysis tool, or a simulator or a hardware based emulator, that uses the logic-level netlist of the design and the given input vector sequence V, to compute the logic values at circuit lines for every vector. This may be done at selected lines.

The logic values may be computed at the lines that are captured in a relatively small number of counts. Which of these counts are computed may depend on the parameters that are to be estimated.

The use of counts may be important. As only the values of a small number of counts may be used at selected lines in the circuit, a hardware based emulation framework may be used because a small number of specific types of counters may be instrumented at low overheads and, at the end of emulation for the long sequence of input vectors, easily off-load a small number of counts to the estimator. Simple expressions may be used in terms of relevant counts as first-order estimators for the desired parameter values. For example, expressions for power estimation may use $a_j$, which may be derived from the number of transitions.

An estimator, in a simple form, may be a first-order estimator for the metric. For power, for example, this estimator may capture the two first-order determinants of power, namely the number of transitions at circuit lines and the capacitive loads at the lines, which is available from the design.

The estimator may be augmented by incorporating additional multiplicative and additive terms. These additional terms may generalize simple estimators in ways that enable resulting augmented estimators to achieve the desired accuracy.

During a statistical learning step, accurate values of the parameter for a short subsequence of the given vectors $V' \subset V$ may be used, where $|V'| \ll |V|$, to estimate the values of multiplicative and additive terms that maximize the match between augmented estimators and the accurate values. The accurate estimate for the input vector subsequence V' may be obtained either by a detailed circuit-level simulation or via measurements made on actual chips fabricated for the design, depending on the phase of the design and the parameter being estimated.

There may be methods for other important tasks, namely identifying the set of circuit lines where various counts are computed and selecting a small training set of input vectors, i.e., selecting subsequence V' from the original sequence V.

Additional details of the problem formulation and initial solution are described in U.S. patent application Ser. No. 13/719,916, entitled "Digital Circuit Power Measurements Using Numerical Analysis," filed Dec. 19, 2012.

Methods to Minimize the Resource

There may be an intrinsic trade-off between measurement accuracy and resource requirement for the sensors.

An advantage in this trade-off may be gained through sensor hardware design, software algorithms, and combinations thereof.

As a result, there are various improved sensor and algorithm designs that range from improved hardware sensor down to software virtual sensor, and the combination of both hardware and software design to make the underlying technology available for various applications that yield the best accuracy and resource result.

Figure 7:
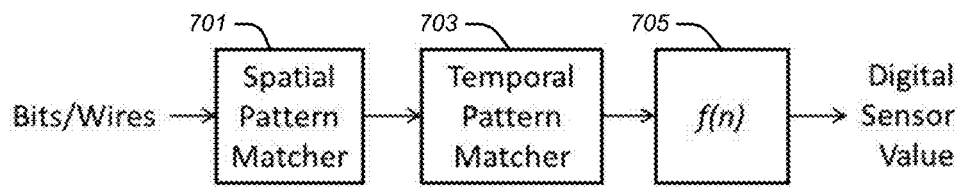
FIG. 7 illustrates a digital sensor that includes various combinations of spatial and temporal pattern matchers followed by a function unit.

FIG. 7 illustrates a digital sensor that includes various combinations of spatial and temporal pattern matchers followed by a function unit. The total chip power and the accumulated digital values from all sensors may be sampled at a regular interval to extract parameters for the algorithms to derive dynamic and static power of each sub-circuits represented by the sensors.

Spatial Pattern Matcher

A spatial pattern matcher 701 may examine one of more bits or wires and may look to match a bit pattern in any one instance of time. This unit can be set to look for a particular pattern in the digital lines and data and produce a corresponding output. For example, control signals or an instruction opcodes can be matched by this unit to determine a unit activity of a functional unit. In some case, a spatial pattern matcher may be simply a wire to directly connect input to the output.

The output of the spatial pattern matcher may then be passed onto a temporal pattern matcher 703 to determine patterns over some duration of time. For instance, the temporal pattern matcher 703 may look for a single bit pattern of 0 followed by 1 over any two clock transitions. This temporal pattern matcher may detect all of the rising signal transition of the bit or the wire.

The output of the temporal pattern matcher 703 may be passed to a functional unit 705 to re-condition the output to represent total activity of the sub-circuits over a sample of time. This functional unit 705 may be made using a combination of a memory or a look-up-table and an accumulator.

The look-up-table can be used to remap the pattern matcher output to match a typical activity of a sub-circuit. This map can be created using simulators with typical input vectors or logic activity estimators through models. In certain cases this map may be a direct 1-to-1 map to eliminate the need for any memory.

The unit activity represented by a digital value can be combined by an arithmetic unit, such as an accumulator, adder, or other functions. For example, accumulators can be used to accumulate the unit activity values to incrementally represent the activity of a sub-circuit over sample of time.

Figure 8:
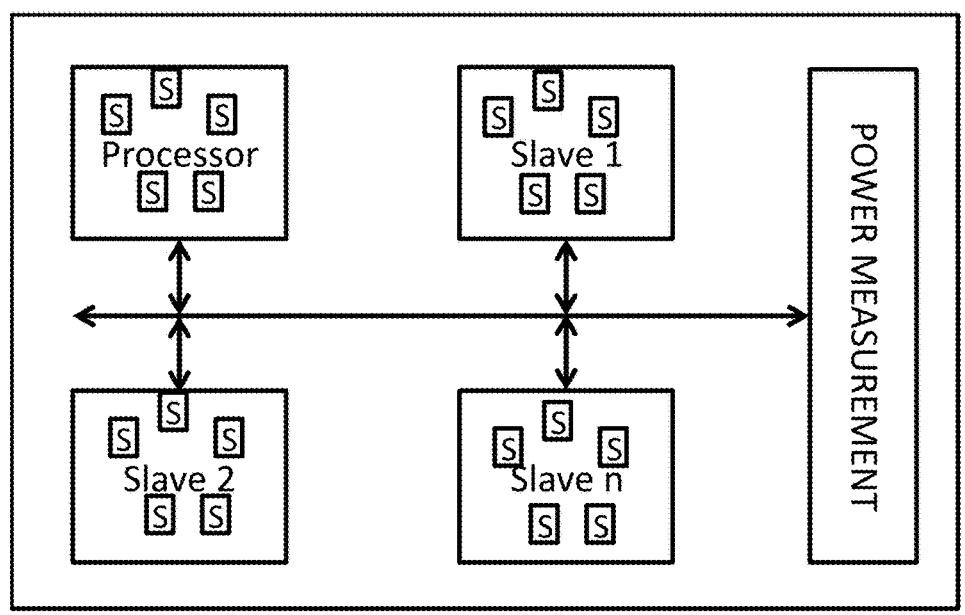
FIG. 8 illustrates an example of a system-on-chip type integrated circuit with a processing unit and several slave peripherals, such as a networking I/O, a serial I/O or a DRAM memory I/O.

FIG. 8 illustrates an example of a system-on-chip type integrated circuit with a processing unit and several slave peripherals, such as a networking I/O, a serial I/O or a DRAM memory I/O. Logic gate-level sensors or digital activity sensors on each component of interest may capture the complete activity of the component, as shown in FIG. 8. This type of sensor can use a spatial sensor that includes a direct wire connection followed by a 0 to 1 pattern matcher over two time states (can be built using an AND gate and a D-flip flop). Then, 0-to-1 transition can be accumulated using a 1-bit accumulator. Multiple 0-to-1 transitions can be also accumulated into a single accumulator to reduce hardware resources at the price of reduction in accuracy.

The values from these sensors may be used by a power management unit, as shown in FIG. 8, to extract dynamic and static power in real time. It may capture activity of each component spatially and measure power at any instant of time.

A proof-of-concept system was implemented on an FPGA platform to test the effectiveness of this type of sensors in various digital logics. This implementation gave a sub-component power measurement that is 99% of the ground truth on an SP605 platform on common benchmark circuits.

Instruction Profiler

Alternatively, instructions or control signals may be used that drive the logic on the chip and match patterns temporally to measure power.

Figure 9:
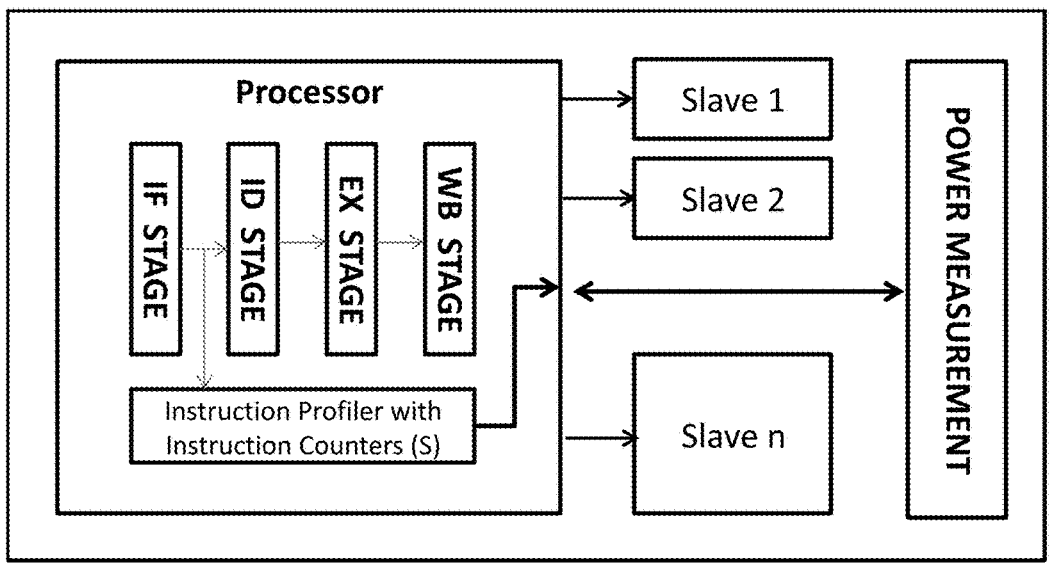
FIG. 9 discloses an example a system-on-chip type integrated circuit where a processing unit ("processor") is combined with one or more slave peripherals, such as a network I/O, a serial I/O, and a DRAM memory I/O).
Figure 10:
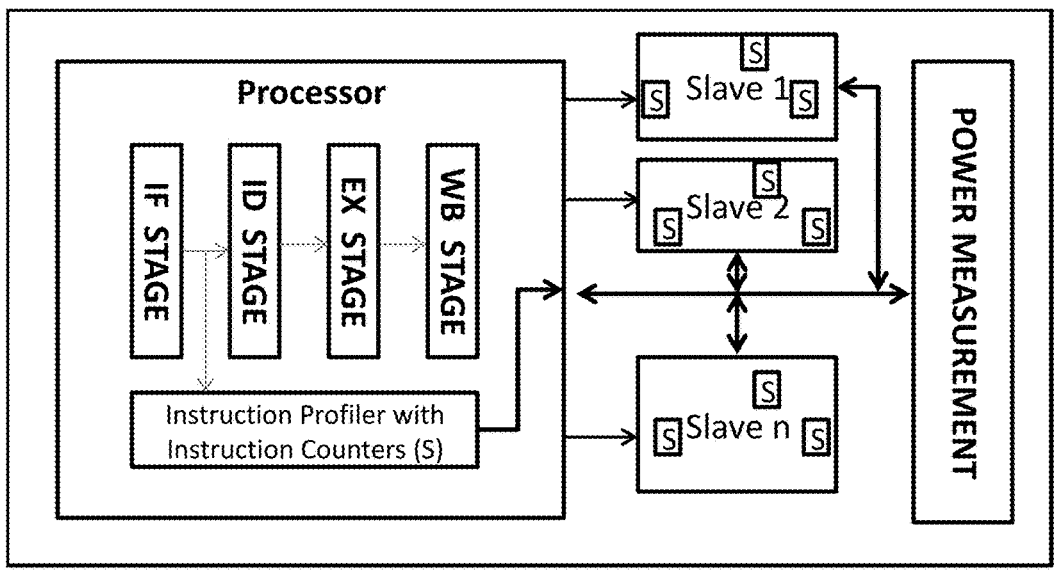
FIG. 10 shows an example of a system-on-chip type integrated circuit.

FIGS. 9 and 10 also illustrates an example of a system-on-chip type integrated circuit with an exploded view of a processing unit and slaves similar to FIG. 8.

In FIG. 9, an instruction profiler is used that matches all the instructions and increments a counter. These instruction counts may be used for all subsequent power calculations. In FIG. 9 only the instruction profiler may be used to calculate power usage.

Power measurements at finer granularity can be done to capture per-component energy by mapping each of these instructions with the components it activates over time. A counter associated with each component may be incremented based on the instruction executed. These counters can be then used as parameters to an algorithm in measuring dynamic power dissipated as each instruction is executed.

Hybrid Instrumentation

There are more complex interactions between several peripheral components which might not include processor intervention for e.g. DMA access or Ethernet packet reception. Such interactions might dissipate power which is non-negligible and cause error in measurements. In the spatial measurement technique, such interactions may be captured efficiently, but may incur greater instrumentation overhead. The temporal power measurement may have low overhead, but may fail to capture such interactions.

FIG. 10 shows an example of a system-on-chip type integrated circuit. In addition to the instruction profiler, digital activity sensors have been added to the slave peripherals. FIG. 10 may be a hybrid of the techniques shown in FIGS. 8 and 9 to capture off processor interactions separately as a component, and all other measurements may use a temporal measurement technique.

This method gave 99% average accuracy implemented over OpenRISC processor running Linux and measuring power real time using external ADC. Software Instrumentation The digital sensor can be instrumented using software only. Total circuit power may be measured and made available to use by the system. Both software and hardware methods can be used in combination to optimize the software and hardware instrumentation resource.

Inserting Software Probes

One implementation of the hardware instrumentation involves modifications in hardware of the extract parameters needed to compute component wise power. However, the same concept may be used in software to identify the number of instructions executed and performed similar analysis.

Each program may be analyzed at the assembly code level to determine basic blocks, control flow, and data flow. Then, probe instructions may be inserted in basic blocks or super blocks to indicate execution of the code segments in a given time. Given instruction profiles of the basic code blocks and the number of executed code blocks, one can determine the instruction profile with negligible run-time overhead.

This method was implemented on an OpenRISC platform running Linux. The result of the software system was 99% accurate, which is a non-intrusive method of measuring power.

Detecting Activity of Peripheral Units

In addition to instruction profile, the program may be analyzed to determine patterns of instructions and data that will induce an activity in the peripheral system. These temporal instruction pattern matchers may be used to accumulate the activity values for each peripheral unit as it has been done using the logic gate-level sensors in hardware; but without the hardware sensors.

Deriving Instruction Profile with OS Level Timestamps

The program schedulers in most modern operating systems (OS) can be modified to timestamp the execution time of all threads running within the system; including the OS itself. Most software has limited control flow and data flow paths. Therefore, all or subset of data may be used for total power measurements, the timestamps, the Register file, and the Program Counter over determined time segments to find the closest execution path. The execution path of the program can be used to determine the instruction profile over time without having to insert probe codes into the programs.

Converting Instruction Power to Physical Circuit Power

Each instruction may have limited or a unique data path within a given processor architecture. Therefore, an analysis may be performed to find the data path of each instruction through a given processor architecture. During this process, various components may be included in software such that, on every instruction issue, that may be efficiently mapped to power consumed over the chip floor plan.

Every instruction may be mapped into a known set of hardware components. Further, associated components may be incremented for every instruction executed. These numbers may be used in the algorithm to extract weights. Once the mapping of instruction to component activity is completed, the instruction profile over sample time defined in hardware or software method can be converted to number of execution of each component in the hardware. For instance, ADDI instruction count N over a sample time can be converted to accumulation of N to multiple components within its data path such as Program Counter, ALU, Registerfile, Pipeline Registers, and a number of multiplexers that it touches. The converted component based activity values can be used as parameters in the algorithm to extract accurate component wise power values.

Sensor Reduction Through Functional Sub-Circuit Clustering

The number of signals monitored for a sub-circuit can be reduced at the cost of reduction in measurement accuracies.

An approximate method may essentially map activities of fewer signals to total activities of larger sub-circuits. The accuracy of its result may be highly dependent on partitioning the circuit, the selection of monitored signals, and the quality of mapping.

One method is to partition the circuit into a logically dependent set of sub-circuits. Then, a subset of signals may be chosen within each sub-circuit and ways may be chosen to monitor the signal activity that best capture its overall power consumption.

A method for partitioning and monitoring a subset of signals may apply the modeling concept called logic cones generated from a circuit, see F. Najm, "*Transition density: a new measure of activity in digital circuits*," IEEE Trans. on Computer-Aided Design of Integrated Circuits and Systems, v12, February 1993; F. Najm, "*A survey of power estimation techniques in VLSI circuits*," IEEE Trans. VLSI Syst. 2(4): 446-455 (1994).

Monitoring activity at the inputs of a logic cone may be necessary and sufficient for computing the total activity at all lines in the cone.

This result may follow from the observation that the logic value at every line in a cone of logic may be determined by the logic values applied at the cone's inputs. Hence, the transitions at the inputs of the cone may completely determine the transitions at every line in the cone.

The activity of each gate can be effectively represented by the activity at the inputs of the logic cones; where a cone is the smallest block of logic whose activity can be observed; which implies that a cone is the smallest block or the finest granularity at which power can be measured using this technique.

In order to implement this technique to achieve maximum accuracy without any changes to the gate network structure, input pattern monitors may be added by identifying logic cones in the Boolean network which defines the system. Initially, monitors can be added to primary inputs of the logic to count the number of logic transitions.

Subsequently, intermediate cones may be identified and additional monitors may be added to the input of each cone. This method may be repeated such that all cones are covered without duplication. Thus, the problem of addition of monitors to achieve given accuracy and granularity may be reduced to optimal number of cone assignment.

Sensor Reduction Using Binary Decision Diagram

The power estimation method in calculating transition density using Binary Decision Diagrams (BDD), see R. E. Bryant. "*Graph-Based Algorithms for Boolean Function Manipulation*," IEEE Transactions on Computers, C-35(8): 677-691, 1986, may be integrated in to signal transition counts on logic equations of each cone.

Through this, transition density may be derived at each gate given an accurate estimation of transition density of its input. Once transition density is estimated for every gate, weights associated with all gate outputs may be extracted. With the knowledge of these weights, for any signal transition at the input, the amount of power drawn at every gate of the logic cone may be estimated.

By applying this estimation technique, the number of sensors needed to obtain accurate measurement may be reduced.

Sensor Reduction Through Sensor Hardware Design

Counters at the output of each digital sensor may be eliminated to reduce the total hardware. Careful analysis of the circuit can allow elimination of signal wires without impacting accuracy.

This approach may use logic simulation and modeling to find redundant and dependent wires that are identified and clustered. Then, the transition counts may be monitored on only one of the wires to represent the activity rate of the sub-circuit, without monitoring all of the other signals.

Another method for reducing sensor may be through logical combination of the transitioning signals from each wire.

Figure 4:
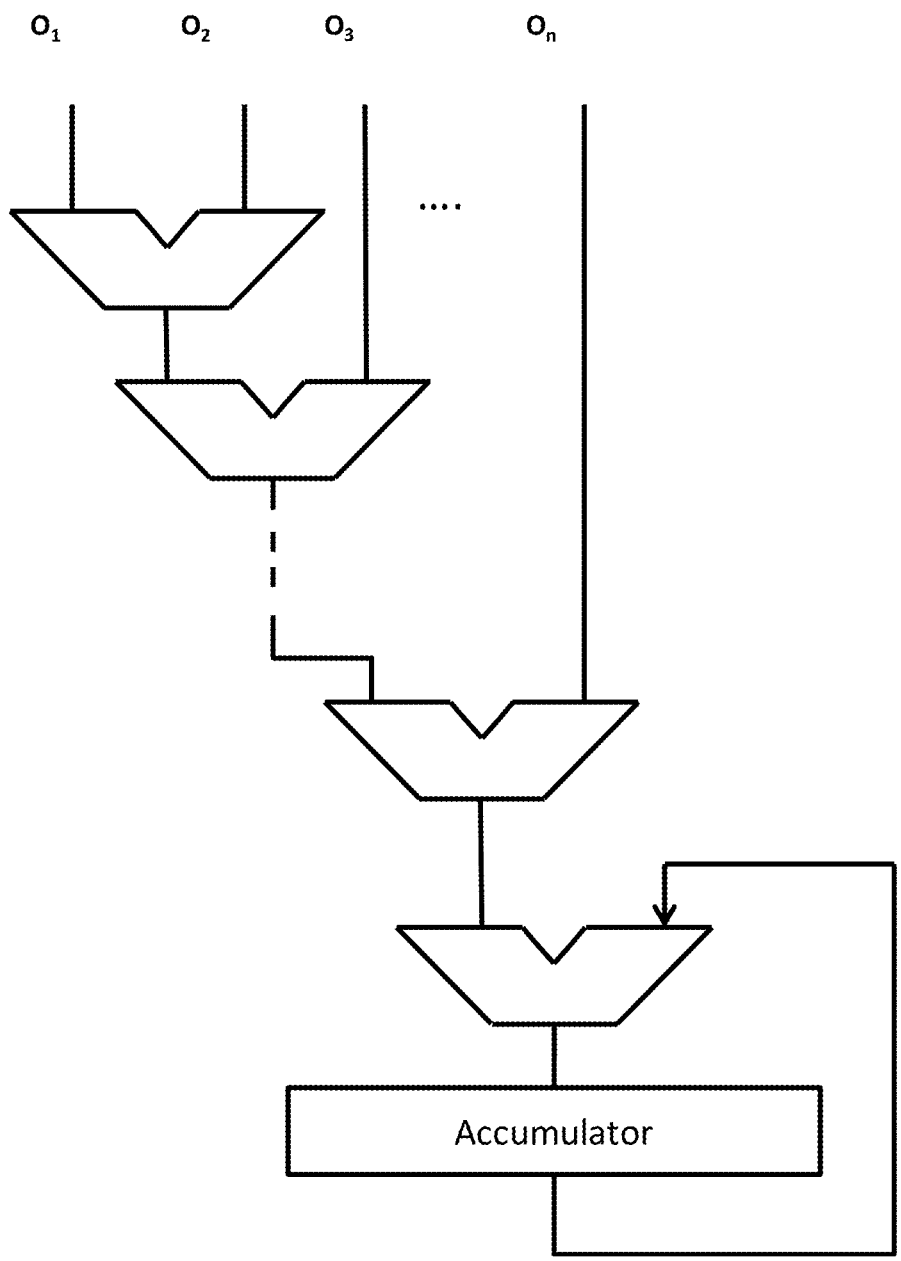
FIG. 4 illustrates an example of a logic circuit that aggregates counts appearing on inputs.

FIG. 4 illustrates an example of a logic circuit that aggregates counts appearing on inputs. This results in fewer counters than the transition sensors.

If all the weights are same, then all the activities may be added.

If the weights are different, they may be grouped based on similar weights.

It may be hard to precisely simulate all blocks. Hence, they may be added based on names of data and/or control.

The sum of all the activity may be accumulated and used to measure power.

Reducing Sensor Logic by Interchanging OR with Adder

Signals based on the similarity of weights may be grouped and OR gates may be added.

The output of these gates may be fed into the logic structure described in FIG. 4.

The sum of all the activity may be accumulated and used to measure power.

Based on the number of OR gates used in the grouping, the ALU section may expand or shrink as well.

Figure 5:
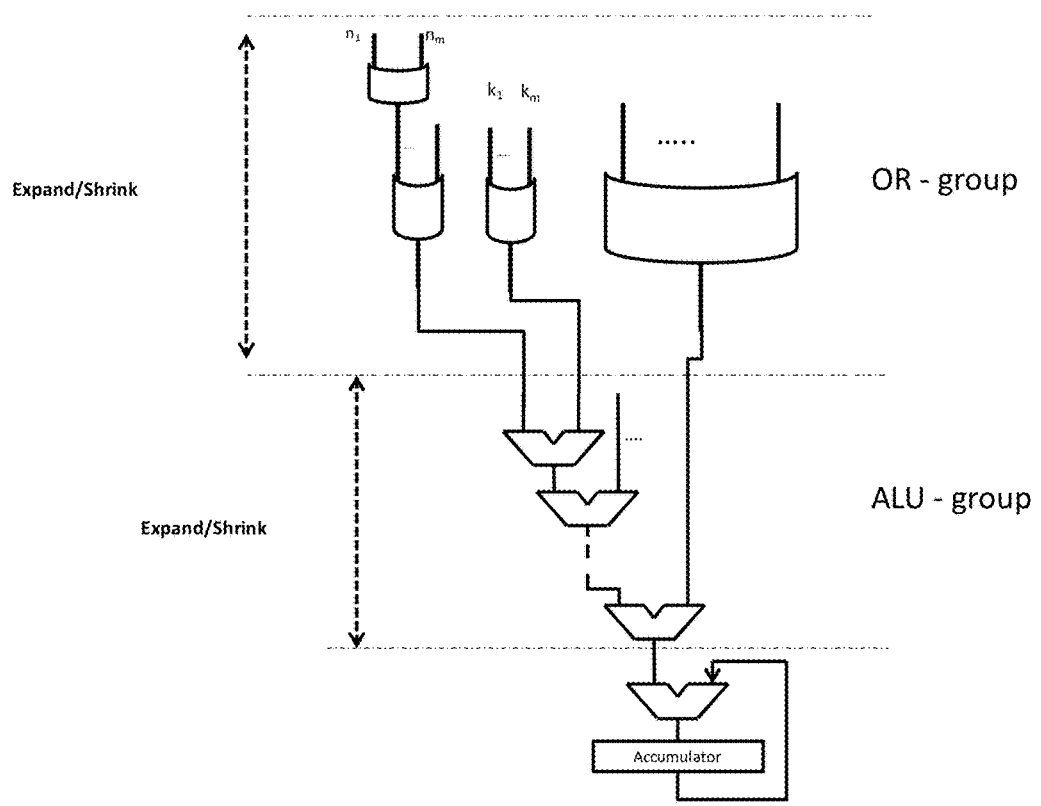
FIG. 5 illustrates an example of a logic circuit that aggregates and accumulates counts that appear on inputs.

FIG. 5 illustrates an example of a logic circuit that aggregates and accumulates counts that appear on inputs.

Figure 6:
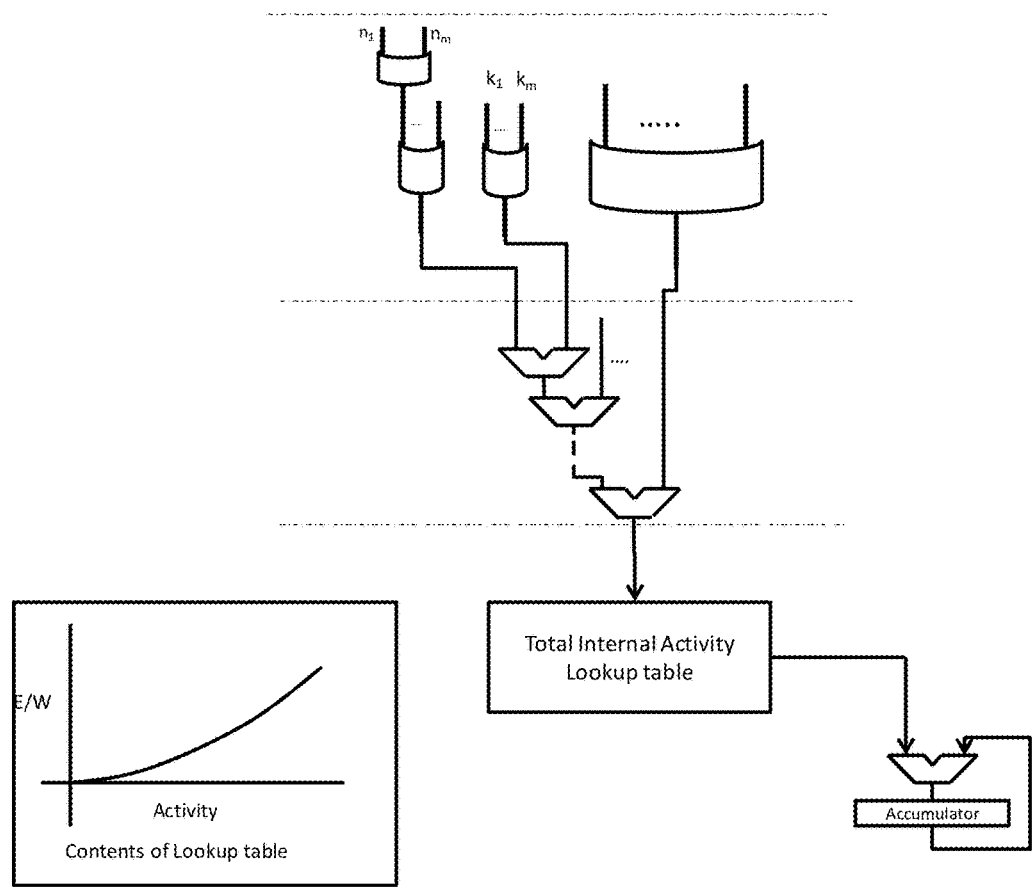
FIG. 6 illustrates an example of a logic circuit that aggregates the activity counts, and also uses a look-up-table to create a non-linear mapping between observed activity and the activity counts used for power estimation.

FIG. 6 illustrates an example of a logic circuit that aggregates the activity counts, and also uses a look-up-table to create a non-linear mapping between observed activity and the activity counts used for power estimation.

The sensor in FIG. 6 may be used in a design where full logic (or its behavior) is known, but the circuit cannot be changed. It may also be applicable for logic designs whose activity is non-linear to input changes.

The logic can be extensively simulated and the values of activity in the lookup table may be stored. By extracting total activity accumulated in each cycle, this may be mapped to a known value to compute subsequent power numbers.

Simulation may be used to load pre-computed data. Accumulated results may be used to partition power in real time.

The graph shown in FIG. 6 may be extracted by cycle to cycle simulation and may subsequently be stored in the lookup table.

Based on the observed activity, power weights may be extracted which directly provide energy values on accumulation due to input activity.

APPLICATIONS

Applications in Chip Verification

One purpose of power estimation during verification may be to identify any serious violation of given power constraints/objectives. This may enable a re-design and avoid high costs and high time-to-market delays associated with first discovering these violations after tape-out, during validation of the chips in the first-silicon batch.

Since fabricated chips may not be available during verification, the approach may use circuit-level simulations for selected subsequences to obtain accurate power values for statistical learning.

This may shape the approach in several important ways. First, circuit-level simulation may have extremely high run-time complexity (particularly, compared to applying vectors to fabricated chips and measuring power). Hence, in this case, it may be imperative to use very short subsequences of input vectors for statistical learning.

Second, circuit simulations can provide power estimates at any desired part of the circuit. (In contrast, power measurements on fabricated chips may only be performed for the full-chip using external sensors; or at the level of individual power sensors integrated on the chip, if any.) Hence, simulation of each vector can provide a significant amount of information. Hence the approach may be optimized to utilize this information to minimize the length of the subsequence used for statistical learning.

Third, the accuracy of the power values provided by circuit-level simulation may be much higher than that obtained via logic-level simulation, but not as accurate as that obtained from measurements on fabricated chips.

Still further, due to high run-time complexity of considering the entire range of process and environmental variations during circuit-level simulations, variations may be captured only at the corners of the variations space (i.e., combinations of extreme values of various parameters).

Power estimation during verification may be optimized for the above characteristics. This approach may provide, at low run-time complexity and for corner cases for variations, reasonably accurate power estimates for every module in the chip (each cache, each core, each important module within the core, and so on). This information may be used to make major design changes, if needed, and help avoid the serious cost and time-to-market penalties by avoiding one or more silicon spins.

The underlying method may use the fine-grained and reasonably accurate power values provided by circuit-level simulations for a very small number of vectors. It may obtain (nearly) equally accurate power values at desired levels of circuit-module granularity for very long sequences of input vectors. Overall run-time complexities may be comparable to logic-level simulation or hardware based emulation.

Applications in Chip Validation

A purpose of power estimation during validation may be to obtain more accurate estimates to identify any violation of the given power constraints/objectives, thereby allowing a re-design and avoiding extremely high costs associated with prematurely moving the design into high-volume manufacturing and discovering the problem thereafter.

Since fabricated chips may not be available during validation, the statistical learning approach can use either circuit-level simulations or measurements on actual fabricated chips, or both, for selected subsequences. This may shape the approach in several important ways. First, due to the lower complexity and higher accuracy, the use of measurements on fabricated chips may be preferred in many cases.

Second, this may enable the process and environmental variations to be captured to a much larger extent. The process variations may be captured by sampling chips from the first-silicon batch. The environmental variations may be captured by making measurements on fabricated chips for a range of temperature, voltages and path delays.

Third, in cases where estimates indicate a violation of power constraints/objectives, a hybrid version of the approach may use the logic-level flow, measurements on fabricated chips, as well as circuit-level simulations for short subsequences of vectors. This may help with precise diagnosis to identify the root causes behind the violations.

The basic methodology may provide more accurate estimates (compared to those during verification) and capture variations much more comprehensively. This is also a completely new approach for diagnosing root causes of any power problems.

Applications During Operation Life

The purpose of power estimation during this phase may be to obtain information that may help optimize desired power-performance objectives. The estimated values of power may be used to control modes (e.g., DVFS and sleep modes), placement of functional units and scheduling of tasks, and adjust the algorithms controlling power to account for temperature and ageing effects.

First, instead of capturing effects of process variations, the approach may be designed to adapt to the specific parameter values for each particular chip.

Second, in this case, there may be no additional cost associated with making chip-level measurements. However, in this case, the interest may be in reducing the complexity of statistical learning.

FIG. 9 discloses an example a system-on-chip type integrated circuit where a processing unit ("processor") is combined with one or more slave peripherals, such as a network I/O, a serial I/O, and a DRAM memory I/O. The processing unit has a specialized instruction profiling unit and the system-on-chip overall has a power management unit. The instruction profile information is the only source of information for the power management unit.

FIG. 9 discloses an example a system-on-chip type integrated circuit where a processing unit ("processor") is combined with one or more slave peripherals, such as a network I/O, a serial I/O, and a DRAM memory I/O. The processing unit has a specialized instruction profiling unit and the system-on-chip overall has a power measurement unit. Digital sensors are instantiated on the slaves to send activity rates to the power measurement unit. The instruction profiling unit also sends information to the power measurement unit where it is combined with the digital activity rate sensors to measure power.

Unless otherwise indicated, the software programming that has been discussed herein is implemented with a computer system configured to perform the functions that have been described herein for the software. The computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The software may also include, one or more operating systems, device drivers, application programs, and/or communication programs.

When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example,

Multi-level and/or hierarchical lookup table

The computer system might utilize a very large lookup table based on the complexity of the design to obtain accurate results. So, a hierarchical lookup table may be used to reduce the memory size and reduce the size of total number of cells required by the lookup table, as shown in FIG. 7. The initial lookup value is used to lookup subsequent tables to get the total activity within the logic. Further, a multi-level lookup table may be used to compensate any nonlinearity that may lead to inaccuracies in the system. The activity input and aggregation may be similar to FIG. 6. The initial lookup table may consists of activity values extracted by simulation as discussed above. The subsequent lookup tables can be used to factor in process voltage and temperature (PVT) variations. The values for these PVT variations can either be extracted from actual foundry data or from the accurate simulation results. These factors can be added to the initial activity lookup values as tuples of multiplicative and/or additive parameters to improve accuracy. These subsequent levels are flexible as the number of tables can be changed based on the circuit complexity and desired accuracy.

Smoothing the Counter Values

The system can save multiple instances of the counter values to evaluate average counts per unit time. Also, these values may be used along with a sliding window algorithm to extract best fit counter values for a particular workload. Using these average values to extract power during different time frames, onset of slower effects such as a NBTI/PBTI ageing and electro migration may be evaluated.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A digital integrated circuit comprising:
   a digital sensor circuit that converts binary bit patterns of wires in a sub-circuit over a given time into a single activity integer value that represents a total activity of the sub-circuit, the digital sensor circuit including a spatial pattern matcher that examines one of more bits or wires for patterns in digital lines and data and a temporal pattern matcher that determine patterns over a duration of time, the temporal pattern matcher receiving an output from the spatial pattern matcher; and a digital data processing circuit that receives multiple activity integer values from multiple digital sensors in multiple sub-circuits and logically combines the multiple activity integer values or uses a lookup table to output a single integer value that represents the total activity of a larger sub-circuit.

2. The digital integrated circuit of claim 1 wherein the digital sensor circuit logically combines binary bit patterns of multiple wires and outputs a single binary value into a wire.

3. The digital integrated circuit of claim 1 wherein the digital sensor circuit logically ORs binary bit patterns of multiple wires and outputs a single binary value into a wire.

4. The digital integrated circuit of claim 1 wherein the digital sensor circuit logically combines binary bit patterns of control signals in a functional unit and outputs a single binary value into a wire.

5. The digital integrated circuit of claim 1 wherein the digital sensor circuit logically encodes binary bit patterns of instruction opcodes in a functional unit and outputs a single binary value into a wire.

6. The digital integrated circuit of claim 1 wherein the digital sensor circuit logically combines binary bit patterns of an output of combinational logic over more than one subsequent time instance and outputs a single binary value into a wire.

7. The digital integrated circuit of claim 1 wherein the digital sensor circuit logically combines binary bit patterns at the output of an instruction opcode encoder over more than one subsequent time instance and outputs a single binary value into a wire.

8. The digital integrated circuit of claim 7 wherein the digital integrated circuit outputs the sampled counts.

9. The digital integrated circuit of claim 7 further comprising a non-linear compensation circuit that maps the sampled counts into a new count value to reflect nonlinearities between changes in the number of binary pattern detections and changes in the typical activity of the sub-circuit that contains a monitored wire.

10. The digital integrated circuit of claim 9 wherein the non-linear compensation circuit includes the lookup table, the lookup table including an integer value map that reflect nonlinearities between changes in the number of binary pattern detections and changes in the typical activity of the sub-circuit that contains the monitored wire.

11. The digital integrated circuit of claim 7 wherein:
the digital data processing circuit sums two or more sampled count values and outputs a single value; and
the digital data processing circuit accumulates output value over time.

12. The digital integrated circuit of claim 1 further comprising a digital counter circuit and a sampling circuit, the digital counter circuit counting appearances of a binary pattern sequence at a single wire output of the spatial pattern matcher as a counter value; and
the sampling circuit sampling the counter value periodically as sampled counts.

13. The digital integrated circuit of claim 12 wherein the digital integrated circuit computes information indicative of an amount of power being consumed by the sub-circuit of the digital integrated circuit based on at least one of the sampled counts.

14. The digital integrated circuit of claim 1 wherein the digital sensor circuit logically combines binary bit patterns of a single wire over more than one subsequent time instance and outputs a single binary value into a wire.

15. The digital integrated circuit of claim 14 further comprising a digital counter circuit and a sampling circuit the digital counter circuit counting appearances of a binary pattern sequence at an output of the single wire of the temporal pattern matcher as a counter value; and
the sampling circuit sampling the counter value periodically as sampled counts.

16. The digital integrated circuit of claim 15 wherein the digital integrated circuit outputs the sampled counts.

17. The digital integrated circuit of claim 15 wherein:
the digital data processing circuit sums two or more sampled count values and outputs a single value; and
the digital data processing circuit accumulates output value over time.

18. The digital integrated circuit of claim 15 further comprising a non-linear compensation circuit that maps the sampled counts into a new integer value to reflect nonlinearities between changes in the number of binary pattern detections and changes in the typical activity of the sub-circuit that contains a monitored wire.

19. The digital integrated circuit of claim 18 wherein the non-linear compensation circuit includes the lookup table, the lookup table including an integer value map that reflect nonlinearities between changes in the number of binary pattern detections and changes in the typical activity of the sub-circuit that contains the monitored wire.

20. The digital integrated circuit of claim 18 wherein the digital integrated circuit computes information indicative of an amount of power being consumed by the sub-circuit of the digital integrated circuit based on at least one of the sampled counts.

21. The digital integrated circuit of claim 1 wherein the digital sensor circuit logically combines binary bit patterns of multiple wires and outputs a single binary value into a wire.

* * * * *